US008008407B2

(12) United States Patent
Oberhellman et al.

(10) Patent No.: US 8,008,407 B2
(45) Date of Patent: Aug. 30, 2011

(54) PROCESS FOR PREPARING SILICONE POLYETHERS

(75) Inventors: Theodore Oberhellman, Midland, MI (US); Yoshiyuki Tanaka, Chiba Prefecture (JP); Charles Neal, Midland, MI (US); Simon Parsley, Midland, MI (US); Brian Deeth, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 254 days.

(21) Appl. No.: 12/294,654

(22) PCT Filed: Mar. 29, 2007

(86) PCT No.: PCT/US2007/007838
§ 371 (c)(1),
(2), (4) Date: Sep. 26, 2008

(87) PCT Pub. No.: WO2007/127004
PCT Pub. Date: Nov. 8, 2007

(65) Prior Publication Data
US 2010/0184935 A1    Jul. 22, 2010

Related U.S. Application Data

(60) Provisional application No. 60/788,085, filed on Mar. 31, 2006.

(51) Int. Cl.
*C08G 77/12* (2006.01)
(52) U.S. Cl. .......................... 525/474; 528/31
(58) Field of Classification Search ................. 525/474; 528/31
See application file for complete search history.

(56) References Cited

U.S. PATENT DOCUMENTS

| | | | |
|---|---|---|---|
| 3,159,601 A | 12/1964 | Ashby | |
| 3,220,972 A | 11/1965 | Lemoreaux | |
| 3,296,291 A | 1/1967 | Chalk | |
| 3,419,593 A | 12/1968 | Willing | |
| 3,516,946 A | 6/1970 | Modic | |
| 3,814,730 A | 6/1974 | Karstedt | |
| 3,980,688 A | 9/1976 | Litteral et al. | |
| 3,989,668 A | 11/1976 | Lee et al. | |
| 4,025,456 A | 5/1977 | Litteral et al. | |
| 4,431,789 A | 2/1984 | Okazaki et al. | |
| 4,515,979 A | 5/1985 | Otsuki et al. | |
| 4,784,879 A | 11/1988 | Lee et al. | |
| 4,847,398 A | 7/1989 | Mehta et al. | |
| 4,857,583 A | 8/1989 | Austin et al. | |
| 4,962,218 A | 10/1990 | Blevins et al. | |
| 5,001,248 A | 3/1991 | Grabowski | |
| 5,036,117 A | 7/1991 | Chung et al. | |
| 5,118,764 A | 6/1992 | Ichinohe et al. | |
| 5,153,293 A | 10/1992 | Hales et al. | |
| 5,159,096 A | 10/1992 | Austin et al. | |
| 5,175,325 A | 12/1992 | Brown et al. | |
| 5,191,103 A | 3/1993 | Mehta et al. | |
| 5,789,612 A * | 8/1998 | Graiver et al. ................. 556/451 |
| 5,986,022 A | 11/1999 | Austin et al. | |
| 5,986,122 A * | 11/1999 | Lewis et al. ................... 556/445 |
| 6,133,370 A | 10/2000 | Gutek et al. | |
| 6,410,772 B2 | 6/2002 | Okuyama et al. | |
| 6,617,365 B2 | 9/2003 | Burkhart et al. | |
| 6,897,280 B2 | 5/2005 | Heisler et al. | |
| 6,987,157 B2 | 1/2006 | Clement et al. | |
| 2006/0217513 A1 | 9/2006 | Asai | |
| 2006/0264602 A1 | 11/2006 | Adams et al. | |
| 2008/0125600 A1 | 5/2008 | Phillips et al. | |

FOREIGN PATENT DOCUMENTS

| | | |
|---|---|---|
| EP | 0347895 | 11/1993 |
| EP | 0368195 | 5/1997 |
| EP | 0398684 | 9/1997 |
| EP | 1104779 | 6/2001 |
| EP | 1035154 | 4/2004 |
| WO | WO2006/076137 | 7/2006 |

* cited by examiner

*Primary Examiner* — Kuo-Liang Peng
(74) *Attorney, Agent, or Firm* — Alan Zombeck

(57) ABSTRACT

A process is disclosed for the preparing silicone polyethers by reacting; (A) a polyether having at least one terminally unsaturated aliphatic hydrocarbon group and an alkali metal content of less than 50 ppm, (B) an organohydrogensiloxane having an acid number of less than 0.005, via a hydrosilylation reaction. The process is particularly useful to prepare silicone polyethers of improved quality via a continuous process.

12 Claims, No Drawings

PROCESS FOR PREPARING SILICONE POLYETHERS

CROSS REFERENCE TO RELATED APPLICATIONS

This application is a U.S. national stage filing under 35 U.S.C. §371 of PCT Application No. PCT/US07/007838 filed on Mar. 29, 2007, currently pending, which claims the benefit of U.S. Provisional Patent Application No. 60/788,085 filed Mar. 31, 2006 under 35 U.S.C. §119(e). PCT Application No. PCT/US07/007838 and U.S. Provisional Patent Application No. 60/788,085 are hereby incorporated by reference.

TECHNICAL FIELD

This invention relates to a process for the preparation of silicone polyethers. The process is useful to prepare silicone polyethers of improved quality, such as those having a —SiOC— content of less than 1 mole %, and is particularly useful when employed in a continuous process.

BACKGROUND

Silicone polyethers (SPEs) are used extensively in a variety of surfactant applications, such as in the production of polyurethane foams, and as ingredients in personal care products. SPE's are typically based on copolymer structures of polyorganosiloxanes having pendant polyoxyalkylene groups. Most commonly, the copolymer structures of silicone polyethers are the "rake" type, where a predominately linear polyorganosiloxane provides the "backbone" of the copolymer architecture with pendant polyoxyalkylene groups forming the "rake". "ABA" structures are also common, where a pendant polyoxyalkylene group is at each molecular terminal of a linear polyorganosiloxane. $(AB)_n$ silicone polyether block copolymers are also known.

Commercially, silicone polyethers are typically made via a platinum catalyzed hydrosilylation reaction in large batch reactors. Because of the significant volumes of silicone polyethers used commercially, a continuous process for their preparation would be desirable. However, attempts to produce silicone polyethers via continuous processes have been limited due to the complexities of the hydrosilylation reaction mechanism. In particular, the production of silicone polyethers via a continuous process often will result in a greater formation of hydrolyzable —Si—O—C— bonds vs. comparable batch reactions, especially if the process is conducted solventless. Typically a large molar excess of the unsaturated polyether is needed in such hydrosilylation reactions. Since it is impossible to separate the silicone polyether product from un-reacted unsaturated polyether starting materials, product quality and performance is limited in certain applications. Thus, there is a need to identify processes to prepare silicone polyethers that are suitable for continuous processing techniques.

The present inventors have discovered a method for preparing silicone polyethers of improved quality. In particular, the inventive process produces silicone polyethers having less hydrolyzable Si—O—C bonds. The present invention is particularly useful to prepare silicone polyethers via a continuous hydrosilylation process.

SUMMARY

This invention relates to a process for preparing a silicone polyether comprising reacting;

(A) a polyether having at least one terminally unsaturated aliphatic hydrocarbon group and an alkali metal content of less than 50 ppm,
(B) an organohydrogensiloxane having an acid number of less than 0.005 via a hydrosilylation reaction.

The process of the present invention is particularly useful to prepare silicone polyethers of improved quality via a continuous process.

DETAILED DESCRIPTION

A) The Polyether

Component A) of the present invention is a polyether having at least one terminally unsaturated aliphatic hydrocarbon group and an alkali metal content of less than 50 ppm. As used herein, "polyether" denotes a polyoxyalkylene copolymer represented by the formula $—(C_nH_{2n}O)—$ wherein n is from 2 to 4 inclusive. The polyoxyalkylene copolymer unit typically may comprise oxyethylene units $—(C_2H_4O)—$, oxypropylene units $—(C_3H_6O)—$, oxybutylene units $—(C_4H_8O)—$, or mixtures thereof. The oxyalkylene units can be arranged in any fashion to form either a block or randomized copolymer structure, but typically form a randomized copolymer group. Typically, the polyoxyalkylene comprises both oxyethylene units $(C_2H_4O)$ and oxypropylene units $(C_3H_6O)$ in a randomized copolymer.

The polyether (A) may be selected from those having the average formula $$R^1O(C_nH_{2n}O)_mR^2,\qquad\text{Formula I}$$

where n is from 2 to 4 inclusive,
m is greater than 2,
$R^1$ is a monovalent terminally unsaturated aliphatic hydrocarbon group containing 2 to 12 carbon atoms,
$R^2$ is $R^1$, hydrogen, an acetyl group, or a monovalent hydrocarbon group containing 1 to 8 carbons.

In Formula I, the polyether is terminated at one end with an unsaturated aliphatic hydrocarbon group containing 2 to 12 carbon atoms, such as an alkenyl or alkynyl group. Representative, non-limiting examples of the alkenyl groups are shown by the following structures; $H_2C=CH—$, $H_2C=CHCH_2—$, $H_2C=C(CH_3)CH_2—$, $H_2C=CC(CH_3)_2—$, $H_2C=CHCH_2CH_2—$, $H_2C=CHCH_2CH_2CH_2—$, and $H_2C=CHCH_2CH_2CH_2CH_2—$. Representative, non-limiting examples of alkynyl groups are shown by the following structures; $HC≡C—$, $HC≡CCH_2—$, $HC≡CC(CH_3)—$, $HC≡CC(CH_3)_2—$, $HC≡CC(CH_3)_2CH_2—$. The polyether may also contain an unsaturated aliphatic hydrocarbon group at each terminal end, when $R^2=R^1$, which will result in the formation of an $(AB)_n$ type of silicone polyether if the organohydrogensiloxane contains at least two SiH units, and in particular terminal SiH units.

Polyethers having an unsaturated aliphatic hydrocarbon group at a molecular terminal are known in the art, and many are commercially available. Representative, non-limiting examples of polyethers, having an alkenyl end group, useful as component (A) include;

$H_2C=CHCH_2O(C_2H_4O)_aH$
$H_2C=CHCH_2O(C_2H_4O)_aCH_3$
$H_2C=CHCH_2O(C_2H_4O)_aC(O)CH_3$
$H_2C=CHCH_2O(C_2H_4O)_a(C_3H_6O)_bH$
$H_2C=CHCH_2O(C_2H_4O)_a(C_3H_6O)_bCH_3$
$H_2C=CHCH_2O(C_2H_4O)_aC(O)CH_3$
$H_2C=C(CH_3)CH_2O(C_2H_4O)_aH$
$H_2C=C(CH_3)_2O(C_2H_4O)_aH$
$H_2C=C(CH_3)CH_2O(C_2H_4O)_aCH_3$
$H_2C=C(CH_3)CH_2O(C_2H_4O)_aC(O)CH_3$ $H_2C=C(CH_3)CH_2O(C_2H_4O)_a(C_3H_6O)_bH$
$H_2C=C(CH_3)CH_2O(C_2H_4O)_a(C_3H_6O)_bCH_3$
$H_2C=C(CH_3)CH_2O(C_2H_4O)_aC(O)CH_3$
$HC\equiv CCH_2O(C_2H_4O)_aH$
$HC\equiv CCH_2O(C_2H_4O)_aCH_3$
$HC\equiv CCH_2O(C_2H_4O)_aC(O)CH_3$
$HC\equiv CCH_2O(C_2H_4O)_a(C_3H_6O)_bH$
$HC\equiv CCH_2O(C_2H_4O)_a(C_3H_6O)_bCH_3$
$HC\equiv CCH_2O(C_2H_4O)_aC(O)CH_3$ where a and b are greater than 0,
alternatively a and b independently may range from 0 to 40, with the proviso that a+b>2.

The polyether may also be selected from those as described in U.S. Pat. No. 6,987,157, which is herein incorporated by reference for its teaching of polyethers.

The polyether (A) must have an alkali metal content of less than 50 ppm, alternatively, less than 10 ppm, or alternatively, less than 5 ppm. As used herein, "ppm" denotes parts per million on a weight basis.

Polyethers, such as those useful as component (A), are typically prepared by the base catalyzed polymerization of alkylene oxides, such as ethylene, propylene, or buytylene oxide. Generally, the base catalyst is an alkali metal hydroxide such as sodium or potassium hydroxide. The alkali metal often remains in the resulting polyether product. However, techniques are known in the art for removing residual alkali metals for such products. Alternatively, non-alkali metal based catalysts are also known in the art. Thus, polyether (A) may be any polyether having an alkali metal concentration of less than 50 ppm (parts per million) by weight. Such levels of alkali metal may be achieved by removing alkali metals from polyethers having alkali metal concentrations in excess of 50 ppm by any method known in the art. Alternatively, the polyether (A) may be prepared by a process that does not add, or minimizes, the amount of alkali metals such that the resulting concentration of alkali metal is less than 50 ppm. The alkali metal content may be determined by any analytical method or technique known in the art.

B) The Organohydrogensiloxane

Component B) of the present invention is an organohydrogensiloxane. As used herein, an organohydrogensiloxane is any organopolysiloxane containing at least one silicon-bonded hydrogen atom (SiH) per molecule. Organopolysiloxanes are well known in the art and are often designated as comprising any number or combination of $(R_3SiO_{0.5})$, $(R_2SiO)$, $(RSiO_{1.5})$, $(SiO_2)$ siloxy units, where R is independently an organic group or hydrocarbon group. When R is methyl in $(R_3SiO_{0.5})$, $(R_2SiO)$, $(RSiO_{1.5})$, siloxy units of an organopolysiloxane, the siloxy units are often designated as M, D, and T units respectively while the $(SiO_2)$ siloxy unit is designated as a Q unit. Organohydrogensiloxanes have similar structures, but have at least one SiH present on a siloxy unit. Thus, methyl based siloxy units in an organohydrogensiloxane can be represented as comprising "$M^H$" siloxy units $(R_2HSiO_{0.5})$, "$D^H$" siloxy units $(RHSiO)$, "$T^H$" siloxy units $(HSiO_{1.5})$. The organohydrogensiloxanes useful in the present invention may comprise any number of M, $M^H$, D, $D^H$, T, $T^H$, or Q siloxy units, providing at least one siloxy unit contains SiH.

The organohydrogensiloxane may be selected from organopolysiloxanes comprising siloxy units of the average formula;

$(R_2HSiO_{0.5})(SiO_2)_w(R_2HSiO_{0.5})$ $(R_2HSiO_{0.5})(SiO_2)_w(R_2SiO)_x(R_2HSiO_{0.5})$ $(R_2HSiO_{0.5})(R_2SiO)_x(R_2HSiO_{0.5})$ $(R_3SiO_{0.5})(R_2SiO)_x(RHSiO)_y(R_3SiO_{0.5})$ $(R_3SiO_{0.5})(R_2SiO)_x(HRSiO)_y(RSiO_{1.5})_z(R_3SiO_{0.5})$ $(R_3SiO_{0.5})(R_2SiO)_x(RHSiO)_y(SiO_2)_w(R_3SiO_{0.5})$ where R is an organic group,
alternatively R is a hydrocarbon group having 1 to 30 carbons,
alternatively R is an alkyl group having 1 to 30 carbons
alternatively R is methyl,
and
$w \geq 0, x \geq 0, y \geq 1$, and z is $\geq 0$.

In one embodiment of the present invention, the organohydrogensiloxane is selected from a dimethyl, methyl-hydrogen polysiloxane having the formula;

$(CH_3)_3SiO[(CH_3)_2SiO]_x[(CH_3)HSiO]_ySi(CH_3)_3$ or, $(CH_3)_2HSiO[(CH_3)_2SiO]_xSiH(CH_3)_2$ where $x \geq 0$, alternatively x=1 to 500, alternatively x=1 to 200, and
$y \geq 1$, alternatively y=1 to 100, alternatively y=1 to 50.

Methods for preparing organohydrogensiloxanes are well known, and many are sold commercially. Organohydrogensiloxanes are typically prepared by an acid catalyzed equilibration of a SiH containing siloxane with other siloxanes, such as cyclosiloxanes like octamethylcyclotetrasiloxane. The acid catalyst used in the equilibration reaction is "neutralized" upon completion of the equilibration reaction.

The organohydrogensiloxanes suitable in the present invention have an acid number of less than 0.005. The "acid number" is defined as the mass (in mg) of KOH needed to neutralize the acidic species per gram of the organohydrogensiloxane, as determined by titration techniques. The acid number of the organohydrogensiloxane may be determined by titrating the organohydrogensiloxane in an aqueous pyridine solution with a standardized NaOH solution of known normality. The end point may be determined by addition of an indicator, or alternatively, by potentiometric techniques. The acid number is determined by the following calculation;

$$\text{Acid No.} = \frac{(\text{Volume of Titrant})(\text{Normality of Titrant})}{\text{grams of organohydrogensiloxane}} (56.1/1000)(1000)$$

$$= \text{mg KOH/g}$$

Such titration methods are well known in the art. One representative, non limiting example is Dow Corning Corporation's Corporate Test Method—CTM 0756 (Dow Corning Corp., Midland, Mich. 48686).

Typically, an organohydrogensiloxane, suitable as component B), is prepared in such a manner so the acid number is less than 0.005, or alternatively post treated after production, so as to ensure the acid number is reduced to less than 0.005. Such post treatments typically are effected by contacting the organohydrogensiloxane with a base, such as solid sodium bicarbonate, calcium carbonate, aqueous solutions of such bases, or a basic gas like ammonia. The organohydrogensiloxane can be further contacted with other solid materials, such as ion exchange resins in a packed bed reactor, or solid carbon, to further reduce the acid number to even lower values. Typically, the organohydrogensiloxane is contacted with carbon, as described in U.S. 60/683,754, which is herein incorporated by reference.

The organohydrogensiloxane useful as component B) in the present invention has an acid number of less than 0.005, alternatively less than 0.003, or alternatively less than 0.0015.

In one embodiment of the present invention the organohydrogensiloxane has an as number less than 0.0015 and the hydrosilylation reaction is done as a continuous process.

The Hydrosilylation Reaction

Components A) and B) are reacted via a hydrosilylation reaction. Hydrosilylation are known in the art and require the addition of an appropriate catalyst. Suitable hydrosilylation catalysts for use in the present invention are known in the art and many are commercially available. Most commonly, the hydrosilylation catalyst is a platinum group metal and is added in an amount of 0.1 to 1000 ppm based on the weight of the reactants A) and B), alternatively 1 to 100 ppm of the platinum group metal. The hydrosilylation catalyst may comprise a platinum group metal selected from platinum, rhodium, ruthenium, palladium, osmium or iridium metal or organometallic compound thereof, or a combination thereof. The hydrosilylation catalyst is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix.

Suitable hydrosilylation catalysts are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B1.

The hydrosilyation reaction can be conducted neat or in the presence of a solvent. The solvent can be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha.

The amount of solvent can be up to 50 weight percent, but is typically from 5 to 25 weight percent, said weight percent being based on the total weight of components in the hydrosilylation reaction. The solvent used during the hydrosilylation reaction can be subsequently removed from the resulting reaction product mixture by various known methods. Typically, this involves heating the contents of the reaction mixture under reduced pressure and collecting the volatile solvent.

The amount of components A) and B) used in the hydrosilylation reaction can vary, and typically the amounts used are expressed as the molar ratio of the total unsaturated groups in component A) vs the SiH content of component B). Typically, the hydrosilylation reaction is conducted with a slight molar excess of the total unsaturated groups vs SiH to ensure complete consumption of the SIH in the hydrosilylation reaction. Typically, the hydrosilylation reaction is conducted with a 20%, alternatively 10%, alternatively 5%, or alternatively 1% molar excess of the unsaturated group content of the polyether vs the molar SiH content of the organohydrogensiloxane.

In one embodiment, the hydrosilylation reaction is conducted such that greater than 99.5 mole % of the SiH of the organohydrosiloxane reacts in the hydrosilylation reaction. The remaining SiH content may be determined by any analytical technique used in the art to measure SiH contents, such as Fourier Transform Infrared (FTIR), and $Si^{29}$ NMR techniques. Alternatively, the hydrosilylation reaction is conducted such that greater than 99.9 mole % of the SiH of the organohydrosiloxane reacts in the hydrosilylation reaction. Alternatively, the hydrosilylation reaction is conducted such that no SiH content is detected by $Si^{29}$ NMR techniques.

The hydrosilylation may be conducted in any batch, semi-continuous, or continuous process known in the art. In one embodiment, the hydrosilylation reaction is conducted in a continuous process using a plug flow reactor.

The inventive process disclosed herein can be used to prepare different types of silicone polyether structures, including "rake", ABA, and $(AB)_n$ configurations.

EXAMPLES

These examples are intended to illustrate the invention to one of ordinary skill in the art and are should not be interpreted as limiting the scope of the invention. All measurements were performed at 23° C., unless indicated otherwise.

Raw Materials:

The representative silicone polyethers prepared in these Examples utilized the following raw materials.

ALLYLPOLYETHER—is a polyoxyethylene ($—CH_2CH_2O—$) polymer, terminated at one end with an allyl group and other end with a OH, having an average $M_W$=550 g/mole.

SILOXANE—Refers to an organohydrogensiloxane of average structure $M-D_5D^H{}_{3.5}-M$ produced by acid catalyzed equilibration of M, D and $D^H$ siloxane intermediates. The "acid number" of the organohydrogensiloxane was determined by Corporate Test Method #0756 (Dow Corning Corporation, Midland Mich.).

Processes

The representative silicone polyethers prepared in these Examples utilized one of the following three processes.

PROCESS 1: Load 215.0 grams allylpolyether and 85.0 grams siloxane into a 500 mL round flask. Close the system and inert with a continuous nitrogen sweep. Mix with a 2 inch (5 cm) impeller blade at 400 rpm. At room temperature (23+/−3 deg C.), add 75 µl of a solution which contains a Pt hydrosilylation catalyst diluted to 2 wt% Pt in isopropanol (8 µg Pt per g reactants). Apply heat to the flask at a constant rate via an electric heating mantle. Immediately upon reaching 80° C., turn off heat source and begin timing. Leave mantle attached to flask. Monitor temperature of flask and appearance of flask contents. The rate of the exothermic chemical reaction determines the rate of temperature increase of the flask contents. If reaction proceeds to completion, flask contents will change in appearance from milky white to translucent white to clear colorless to amber colorless. Record the time that it takes between turning off heat at 80 deg C., and a clear colorless appearance. This value is referred to as the "clearing time". The clear colorless appearance is achieved at >95% reaction conversion and thus is a reliable indicator that the reaction is very nearly complete. Allow the flask contents to remain at their maximum temperature for 5-20 minutes after the clear appearance is first observed. Cool to below 70 deg C. before exposing flask contents to air.

PROCESS 2: Load 716.7 grams allylpolyether and 283.3 grams siloxane into a 2 liter reaction calorimeter (Mettler Toledo Model RC1). Heat reactor contents to 90° C., isothermal mode, under a nitrogen atmosphere and with an agitation rate of 1000 rpm. Add 0.25 ml of a solution which contains a Pt hydrosilylation catalyst diluted to 2 wt % Pt in isopropanol (8 μg Pt per g reactants). Upon addition of catalyst, an exothermic reaction is initiated. The calorimeter is capable of controlling temperature within +/−1 deg C. of isothermal while continuously measuring the thermal energy being released by the exothermic chemical reaction. The rate of heat evolution is proportional to rate of the reaction and is plotted either as Kilojoules vs time or as Conversion vs time. When the exotherm is observed to have finished, the reactor contents are maintained at temperature for an additional 15 minutes, then cooled to less than 70° C. before being exposed to air.

PROCESS 3: A continuous plug flow reactor system that provides sufficient mass transfer to prevent phase separation of the unreacted raw materials was used in this process. Allylpolyether, which can be premixed with catalyst, or catalyst can be fed directly to the reactor, and siloxane are simultaneously fed to the first stage of the reactor. Any of the feed streams may be preheated. The ratio of polyether mass flow to siloxane mass flow is determined by the required product structure. Reactants pass between stages through specially designed stage dividers which eliminate back mixing. The outlet of the final stage passes through a cooler. The catalyst consists of a neutral Pt hydrosilylation catalyst (e.g. Karstedt's catalyst) diluted to 2 wt % Pt in isopropanol and can be fed to provide a Pt concentration of between 2-8 μg Pt per g of reactants (ppm). The resulting product is evaluated by viscosity and cloud point. The extent of reaction completion is >99% as assessed by SiH conversion.

Example 1 (Comparative)

A silicone polyether was prepared using PROCESS 1 with an allylpolyether containing 200 ppm residual Na (Dow Chemical AE501) and siloxane with <0.001 mg KOH/g acid equivalent (acid number). The reaction contents reached a maximum temperature of 92-94° C. and then cooled to room temperature without reaching completion. When the reaction was conducted at 100-105 deg C, a product with 5-10 mole % SiOC impurity by Si29 NMR and cloud point of 50-70° C. was obtained. Viscosity was 400+/−150 cS (mm$^2$/s). Product was not acceptable due to low cloud point.

Example 2

A silicone polyether was prepared using Process 1 with an allylpolyether containing 1.2 ppm residual Na (Sanyo TG501) and siloxane with <0.001 acid number. This resulted in a reaction which reached a maximum temperature of 120-130 deg C. The clearing time for this experiment was 5 minutes. The product contained no detectable SiOC impurity by Si$^{29}$ NMR and cloud point >90 deg C. Viscosity was 300+/−15 cS (mm$^2$/s).

Example 3

A silicone polyether was prepared using Process 1 with an allylpolyether containing 5.0 ppm residual Na (Dow SF501 MgSil) and a siloxane with <0.001 acid number. This resulted in a reaction which reaches a maximum temperature of 126° C. The clearing time for this experiment was 10.5 minutes. The product contained no detectable SiOC impurity by Si$^{29}$ NMR and displayed a cloud point >90 deg C. The tetracyclosiloxane content of this product was 3-4 mole %.

Example 4 (Comparative)

A silicone polyether was prepared using Process 1 with an allylpolyether containing 1.2 ppm residual Na (Sanyo TG501), siloxane with <0.001 acid number, and 0.004 grams sodium acetate. This resulted in a reaction which reached a maximum temperature of 125° C. with a clearing time of 11 minutes. This shows the reaction rate was reduced by addition of sodium acetate.

Example 5 (Comparative)

A silicone polyether was prepared using Process 1 and an allylpolyether containing 1.2 ppm residual Na (Sanyo TG501), siloxane with <0.001 acid number, and 0.0046 grams of potassium acetate. This resulted in a reaction which reached a maximum temperature of 116° C. with a clearing time of 18 minutes. This shows the reaction rate was reduced by addition of potassium acetate.

Example 6

A silicone polyether was prepared using Process 2 and an allylpolyether containing 5.0 ppm residual Na (Dow Chemical SF501 MgSil) and siloxane with <0.001 mg KOH/g acid equivalent (acid number). These conditions resulted in a maximum rate of heat generation of 40 joules per second and a reaction time of 80 minutes.

Example 7

A silicone polyether was prepared using Process 2 and an allylpolyether containing 1.2 ppm residual Na (Sanyo TG501) and siloxane with <0.001 acid number. These conditions resulted in a maximum rate of heat generation of 180 joules per second and a reaction time of 15 minutes.

Example 8

A silicone polyether was prepared using Process 1 and an allylpolyether containing 1.2 ppm residual Na (Sanyo TG501) and siloxane with 0.010 acid number. This resulted in a reaction which reached a maximum temperature of 128° C. The clearing time for this experiment was 2.5 minutes (faster than baseline without acid). The product contained detectable SiOC impurity by Si29 NMR and had a viscosity >1000 cS (mm$^2$/s).

Example 9 (Comparative)

A silicone polyether was prepared using Process 1 using allylpolyether containing 200 ppm residual Na (Dow AE501), siloxane with <0.001 acid number, and 20-100 μg acetic acid per gram reactants. This reaction required extended heat input to complete reaction, and yielded a product with 3-5 mole % SiOC impurity by Si29 NMR and had a cloud point of >80° C. Viscosity was 300 cS (mm$^2$/s). This shows that acetic acid suppresses side reactions but the reaction is still relatively slow with Na present.

Example 10

A silicone polyether was prepared using Process 3 and an allylpolyether containing 1 ppm residual Na (Dow SF501 ion exchange) and siloxane with <0.001 acid number. The reaction temperature was controlled throughout process stages over a range of 100-120° C. The silicone polyether had properties equivalent to Example 2.

Example 11

A silicone polyether was prepared using Process 1 using a reaction which reaches a maximum temperature of 120-130 deg C. The resulting allyl polyether containing 1 ppm residual K and siloxane with ~0.003 acid number results in product viscosity is >600 cS (mm$^2$/s).

Example 12

A silicone polyether was prepared using Process 1 using allyl polyether containing 1.5 ppm residual Na and siloxane with ~0.003 acid number results in a reaction which reaches a maximum temperature of 120-130 deg C. The resulting product viscosity is ~330 cS (mm$^2$/s).

Example 13

A silicone polyether was prepared using Process 3 using an allyl polyether containing 1 ppm residual K, a siloxane with ~0.003 acid number, and a Pt concentration of 8 ppm. The reactor residence time was 40 min. The maximum reaction temperature controlled throughout process stages was 100-120 deg C. The resulting product had a viscosity of 1057 cS (mm$^2$/s) and a cloud point 77.2° C. at >99% SiH conversion.

Example 14

A silicone polyether was prepared using Process 3 and an allyl polyether containing 1 ppm residual K, a siloxane having a 0.002 acid number, and a Pt concentration of 8 ppm. The reactor residence time was 20 min. The maximum reaction temperature controlled throughout process stages was 100-120° C. The resulting product had a viscosity of 503 cS (mm$^2$/s) and a cloud point 86° C. at >99.5% SiH conversion.

Example 15

A silicone polyether was prepared using Process 3 using an allyl polyether containing 1 ppm residual K, a siloxane with <0.001 acid number, and a Pt concentration of 4 ppm resulted in a reaction which reached a maximum temperature of 120-130° C. at a reactor residence time of 20 min. The resulting product viscosity was 254 cS (mm$^2$/s) and a cloud point of 100° C. at >99.5% SiH conversion.

Example 16

A silicone polyether was prepared using Process 3 and an allyl polyether containing 2.5 ppm residual K, a siloxane with <0.001 acid number, and a Pt concentration of 4 ppm resulted in a reaction which reached a maximum temperature of 120-130° C. at a reactor residence time of 40 min. The resulting product viscosity was 256 cS (mm$^2$/s) and had a cloud point of 100° C. at >99.5% SiH conversion.

Example 17

A silicone polyether was prepared using Process 3 and an allyl polyether containing ~2.5 ppm residual K, a siloxane with 0.0015 acid number, and Pt concentration of 4 ppm resulted in a reaction which reached a maximum temperature of 120-130° C. at a reactor residence time of 40 min. The resulting product viscosity was 256 cS (mm$^2$/s) and had a cloud point of 100° C. at >99.5% SiH conversion.

Example 18

A silicone polyether was prepared using Process 3 using an allyl polyether containing ~2.5 ppm residual Na, a siloxane with <0.001 acid number, and a Pt concentration of 4 ppm, resulted in a reaction which reached a maximum temperature of 120-130° C. at a reactor residence time of 40 min. The resulting product viscosity was 258 cS (mm$^2$/s) and had a cloud point 100° C. at >99.5% SiH conversion.

Example 19

A silicone polyether was prepared using Process 3 and an allyl polyether containing ~2.5 ppm residual Na, a siloxane with ~0.0015 acid number, and a Pt concentration of 4 ppm resulted in a reaction which reached a maximum temperature of 120-130° C. at a reactor residence time of 20 min. The resulting product viscosity was 261 cS (mm$^2$/s) and had a cloud point 100° C. at >99.5% SiH conversion.

Example 20

A silicone polyether was prepared using Process 3 and an allyl polyether containing 1 ppm residual K, a siloxane with <0.001 acid number, and a Pt concentration of 2 ppm resulted in a reaction which reached a maximum temperature of 120-130° C. at a reactor residence time of 20 min. The resulting product viscosity was 258 cS (mm$^2$/s) and had a cloud point of 100° C. at >99.5% SiH conversion.

Example 21

A silicone polyether was prepared using Process 3 and an allyl polyether containing 0.71 ppm residual Na, a siloxane with <0.001 acid number, and a Pt concentration of 2 ppm resulted in a reaction which reached a maximum temperature of 120-130° C. at a reactor residence time of 40 min. The resulting product viscosity was 277 cS (mm$^2$/s) and had a cloud point 100° C. at >99.5% SiH conversion.

Example 22

A silicone polyether was prepared using Process 1. The reactants were 166.0 grams of polyether Dow Chemical Co. SF501 and 184.0 grams of a siloxane with an average structure M-D$_{93}$D$^H_6$-M and an acid number <0.001. This resulted in a reaction which reached a maximum temperature of 118 deg C. The clearing time for this experiment was 3 minutes. The product contained no detectable SiOC impurity by Si$^{29}$ NMR. The reaction was >99% complete based upon SiH measurement. Viscosity was 3600 cS (mm$^2$/s).

Example 23

A silicone polyether was prepared using Process 1. The reactants were 163.1 grams of polyether Dow Chemical Co. SF501 and 136.9 grams of a siloxane with an average structure M-$^H$D$_{13}$-M$^H$ and an acid number <0.001. This resulted in a reaction which reached a maximum temperature of 105 deg C. The clearing time for this experiment was 2 minutes. The product contained no detectable SiOC impurity by Si$^{29}$NMR.

The reaction was >99% complete based upon SiH measurement. Viscosity was 285 cS (mm²/s).

Example 24

A silicone polyether was prepared using Process 1. The reactants were 194.4 grams of a polyether containing an average of 7 ethylenoxy unit per molecule, Mw=400 g/mole (Dow Chemical Co. SF400) and 105.6 grams of a siloxane with an average structure $M-D_5D^H{}_{3.5}-M$ and an acid number <0.001. This resulted in a reaction which reached a maximum temperature of 135 deg C. The clearing time for this experiment was 5 minutes. The product contained no detectable SiOC impurity by $Si^{29}NMR$. The reaction was >99% complete based upon SiH measurement. Viscosity was 200 cS (mm²/s). Polydispersity (Mw/Mn) determined by Gel Permeation Chromatography was 1.3.

Example 25

A silicone polyether was prepared using Process 1. Polyether 1 contained an average of 18 ethylenoxy and 18 propylenoxy units per molecule and an acetate endgroup. Polyether 2 contained an average of 12 ethylenoxy and no propylenoxy units per molecule and an acetate endgroup. The reactants were 206 grams Polyether 1, 51.6 grams Polyether 2 and 42.4 grams of a siloxane with the average structure $M-D_{169}D^H{}_{23}-M$ and acid number <0.001. This resulted in a reaction which reached a maximum temperature of 105 deg C. The clearing time for this experiment was 4 minutes. The reaction was >98% complete based upon SiH measurement. Viscosity was 900 cS (mm²/s). The surfactant efficiency, tested by a polyurethane foam application protocol, was equivalent to product made using standard methods which include alkali containing raw materials and solvent.

The invention claimed is:

1. A process for preparing a silicone polyether comprising reacting;
   (A) a polyether having at least one terminally unsaturated aliphatic hydrocarbon group and an alkali metal content of less than 50 ppm,
   (B) an organohydrogensiloxane having an acid number of less than 0.005, via a hydrosilylation reaction.

2. The process of claim 1 wherein the silicone polyether has a —SiOC— content of less than 1 mole percent.

3. The process of claim 1 wherein the polyether (A) has the average formula $$R^1O(C_nH_{2n}O)_mR^2,$$

where n is from 2 to 4 inclusive,
m is greater than 2,
$R^1$ is an unsaturated aliphatic hydrocarbon,
$R^2$ is $R^1$, hydrogen, an acetyl group, or a monovalent hydrocarbon containing 1 to 8 carbons.

4. The process of claim 3 where
n =2, $R^1$ is an allyl group, and $R^2$ is hydrogen.

5. The process of claim 1 wherein the organohydrogensiloxane is selected from an organopolysiloxane comprising the average formula;

$$(R_2HSiO_{0.5})(SiO_2)_w(R_2HSiO_{0.5})$$

$$(R_2HSiO_{0.5})(SiO_2)_w(R_2SiO)_x(R_2HSiO_{0.5})$$

$$(R_2HSiO_{0.5})(R_2SiO)_x(R_2HSiO_{0.5})$$

$$(R_3SiO_{0.5})(R_2SiO)_x(RHSiO)_y(R_3SiO_{0.5})$$

$$(R_3SiO_{0.5})(R_2SiO)_x(HRSiO)_y(RSiO_{1.5})_z(R_3SiO_{0.5})$$

$$(R_3SiO_{0.5})(R_2SiO)_x(RHSiO)_y(SiO_2)_w(R_3SiO_{0.5})$$

where R is an organic group,
$w \geq 0$, $x \geq 0$, $y \geq 1$, and z is $\geq 0$.

6. The process of claim 5 wherein the organohydrogensiloxane is a dimethyl, methyl-hydrogen polysiloxane having the formula;

$$(CH_3)_3SiO[(CH_3)_2SiO]_x[(CH_3)HSiO]_ySi(CH_3)_3 \text{ or}$$

$$(CH_3)_2HSiO[(CH_3)_2SiO]_xSiH(CH_3)_2$$

where $x \geq 0$ and $y \geq 2$.

7. The process of claim 1 wherein the hydrosilylation reaction is catalyzed by a platinum compound.

8. The process of claim 1 where the molar ratio of the unsaturated groups of the polyether A) to the SiH content of the organohydrogensiloxane B) is greater than one.

9. The process of claim 8 wherein the polyether A) has the formula $$H_2C=CHCH_2O(C_2H_4O)_aH$$

where a is greater than 2,
and organohydrosiloxane B) has the average formula $$(CH_3)_3SiO[(CH_3)_2SiO]_x[(CH_3)HSiO]_ySi(CH_3)_3$$

where $x \geq 0$ and $y \geq 1$.

10. The process according to claims 1 wherein greater than 99.5 mole % of the SiH of the organohydrosiloxane reacts in the hydrosilylation reaction.

11. The process according to claims 1 wherein the hydrosilylation reaction occurs in a continuous process.

12. The process according to claim 11 wherein the continuous process occurs in a plug flow reactor.

* * * * *